United States Patent
Matsuoka

(10) Patent No.: US 7,342,532 B1
(45) Date of Patent: Mar. 11, 2008

(54) RADAR SYSTEM AND CONTAMINATION JUDGING METHOD

(75) Inventor: Katsuji Matsuoka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/713,694

(22) Filed: Mar. 5, 2007

(30) Foreign Application Priority Data

Oct. 6, 2006 (JP) ............................. 2006-274860

(51) Int. Cl.
- G01S 7/40 (2006.01)
- G01S 13/00 (2006.01)
- G01S 13/93 (2006.01)

(52) U.S. Cl. .................. 342/173; 342/70; 342/89; 342/91; 342/118; 342/165; 342/174; 342/175; 342/195; 343/872

(58) Field of Classification Search ............... 701/300, 701/301; 180/167–169; 343/872, 873; 342/70–72, 342/89–93, 118, 128–133, 165–175, 195
See application file for complete search history.

(56) References Cited

U.S. PATENT DOCUMENTS

| | | | |
|---|---|---|---|
| 2,952,296 A * | 9/1960 | Kofoid ........................ 342/173 |
| 3,225,295 A * | 12/1965 | Altman et al. .............. 342/173 |
| 4,999,639 A * | 3/1991 | Frazita et al. ............... 343/872 |
| 5,485,159 A * | 1/1996 | Zhang et al. ................ 342/165 |
| 5,528,249 A * | 6/1996 | Gafford et al. ............. 343/872 |
| 5,929,802 A * | 7/1999 | Russell et al. ............... 342/70 |
| 5,959,570 A * | 9/1999 | Russell ........................ 342/70 |
| 6,107,956 A * | 8/2000 | Russell et al. ............... 342/70 |
| 6,219,005 B1 * | 4/2001 | Szafranek ................... 343/872 |
| 6,275,182 B1 * | 8/2001 | Meierbachtol ............. 342/174 |
| 6,278,399 B1 * | 8/2001 | Ashihara .................... 342/173 |
| 6,414,623 B1 * | 7/2002 | Ashihara .................... 342/70 |
| 6,433,753 B1 * | 8/2002 | Zimmermann ............. 343/872 |
| 6,469,659 B1 * | 10/2002 | Lajiness et al. ............ 342/173 |
| 6,686,872 B2 * | 2/2004 | Vacanti ....................... 342/173 |
| 6,958,725 B1 * | 10/2005 | Price et al. ................. 342/173 |

FOREIGN PATENT DOCUMENTS

JP 10-282229 A 10/1998

* cited by examiner

Primary Examiner—Bernarr E. Gregory
(74) Attorney, Agent, or Firm—Sughrue Mion, PLLC

(57) ABSTRACT

Provided are a radar system and a contamination judging method capable of reducing adjustment costs and detecting contamination adhering to a radome with accuracy. The radar system includes an antenna for transmitting a transmission wave in a plurality of different directions and for receiving a reflected wave, a radome for protecting the antenna, and a signal processing unit for calculating a distance to an object based on the transmission wave and the reflected wave, in which the radome has a metallic reflecting section provided in a predetermined direction with respect to the antenna, the signal processing unit has a contamination judging unit which calculates a deviation between a reception level of the reflected wave from the reflecting section in the predetermined direction and a reception level of the reflected wave from directions other than the predetermined direction and judges contamination adhering to the radome based on the deviation.

30 Claims, 12 Drawing Sheets

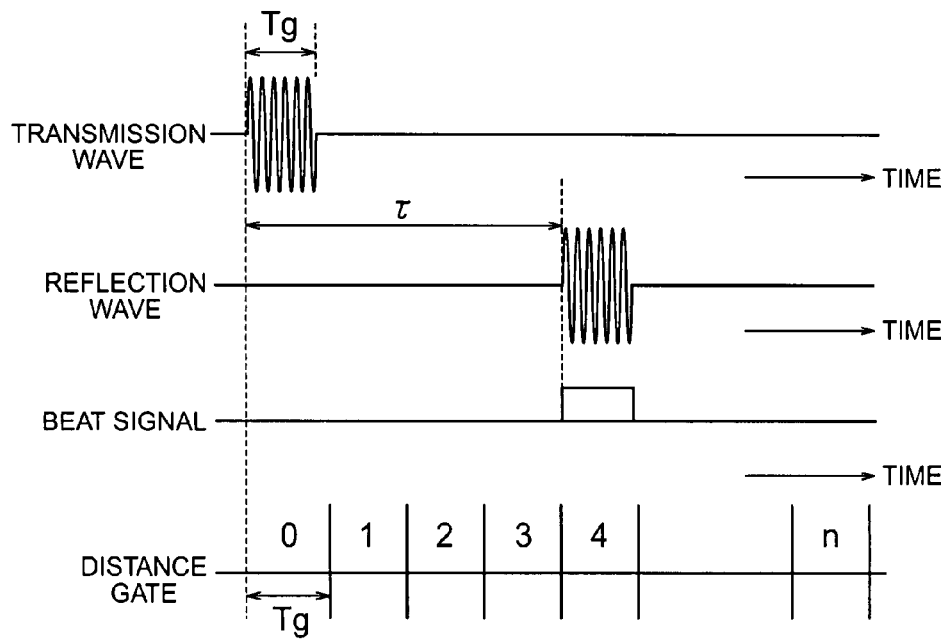
FIG. 5
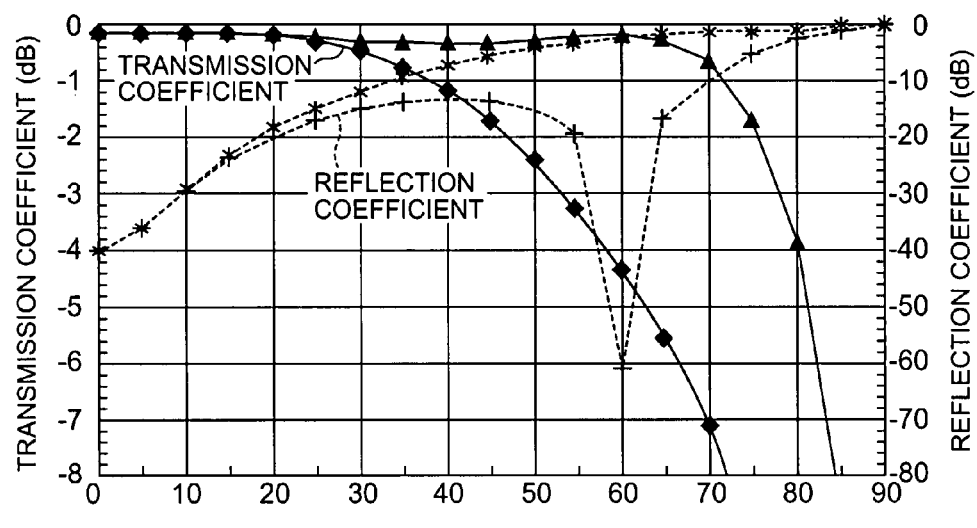
FIG. 6
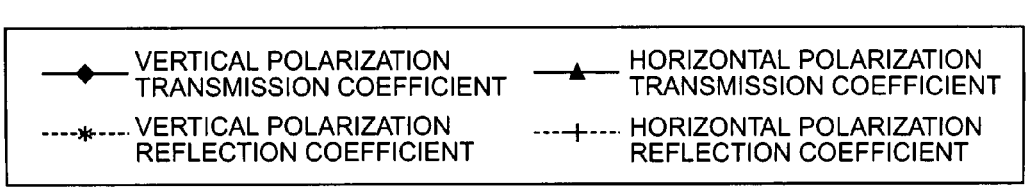

RADAR SYSTEM AND CONTAMINATION JUDGING METHOD

BACKGROUND OF THE INVENTION

1. Field of the Invention

The present invention relates to a radar system, mounted on a vehicle for example, and used for calculating a distance etc. to an object by using an electromagnetic wave, and more specifically, to a method of judging for the presence of contamination on a radome.

2. Description of the Related Art

In general, a radio-wave type radar system has such a merit that the radar system can be mounted on an inside of an exterior of a vehicle without impairing a design of the vehicle because of characteristics of its medium.

Therefore, in many cases, the radar system is mounted on the inside of the exterior of the vehicle, and a radome for protecting an antenna of the radar system is mounted on the exterior of the vehicle.

When contamination such as a film of water containing snow and dirt for example is present on the radome at this time, the electromagnetic wave transmitted from the antenna is reflected on the surface of the radome without transmitting through the radome and the antenna receives the reflected wave from the radome.

Therefore, the radar system receives the reflected wave from a very close distance, causing a problem in that accuracy of calculation for calculating the distance etc. to the object drops.

In order to solve the above-mentioned problem and to improve the accuracy of the calculation, a conventional FM radar system transmits a FM signal sweeping frequencies, receives a reflected signal from an object, and detects position of the object from a frequency of a be at signal obtained by mixing a part of the reflected and transmission signals. The FM radar system has means for detecting contamination adhering to a radome of the antenna based on a level of a low-frequency component of the be at signal and processes the be at signal by two types of filters of a band-pass filter and a low-pass filter. The system detects the position of the object based on an output of the band-pass filter and detects the contamination on the radome based on an output of the low-pass filter (see, for example, JP 1998-282229 A).

The conventional system described above detects that the contamination is present on the radome by comparing frequency spectrum data of the low frequency component obtained by converting the low frequency component of the be at signal from analog to digital and implementing fast Fourier transform with frequency spectrum data of the low frequency component when the radome is not contaminated.

Herein, as reflected wave components of a very close distance other than the reflected wave from the surface of the radome caused by the contamination adhering to the radome, there exist reflected wave components of the close distance caused by a leak between transmission and reception within a high frequency circuit or caused by a leak between the transmission and reception antennas.

Levels of those reflected wave components changes depending on individual differences of the radar system and on temperature because it is determined by a phase relationship with the transmission wave component to be mixed.

The conventional FM radar system has a problem in that its accuracy for detecting the contamination adhering to the radome is reduced because the conventional FM radar system gives no consideration to the reflected wave component in the close distance.

In view of the above, in order to solve the above-mentioned problem and to improve the accuracy of detection, there can be considered a method of providing a plurality of maps of criterion values by taking temperature characteristics into consideration and of detecting the contamination adhering to the radome based on these maps.

However, the method has a problem in that adjustment costs increase because each individual radar system must be provided with the maps of the criterion value.

There can be also considered a method of always learning the reflected wave components in the close distance, storing learnt values and of detecting contamination adhering to the radome based on variations from the learnt values.

However, the method has a problem in that the radar system cannot detect the variations and thus cannot detect the contamination because when the contamination adheres to the radome while the radar system is in a halt, for example, the aforementioned learning starts in the state where the contamination is present on the radome when an engine starts.

SUMMARY OF THE INVENTION

Accordingly, it is an object of the present invention to solve the above-mentioned problems and provides a radar system, and a contamination judging method, that can cut the adjustment costs and detect the contamination adhering to the radome with high precision.

According to the present invention, there are provided a radar system and a contamination judging method. The radar system includes: an antenna for transmitting an electromagnetic wave in a plurality of different directions as a transmission wave and for receiving a reflected wave from an object; a radome for protecting the antenna; and signal processing means for calculating a distance to the object based on the transmission wave and the reflected wave. In the radar system, the radome has a metallic reflecting section provided in a predetermined direction with respect to the antenna; the signal processing means has contamination judging means for judging contamination adhering to the radome; and the contamination judging means calculates a deviation between a reception level of the reflected wave from the reflecting section in the predetermined direction and a reception level of the reflected wave from directions other than the predetermined direction, and judges contamination adhering to the radome based on the deviation.

According to the radar system and the contamination judging method of the present invention, the radome has the metallic reflecting section provided in the predetermined direction with respect to the antenna, and the contamination judging means calculates the deviation between the reception level of the reflected wave from the reflecting section in the predetermined direction and the reception level of the reflected waves from the directions other than the predetermined direction and judges contamination adhering to the radome based on the deviation.

Therefore, the adjustment costs can be cut and the contamination adhering to the radome can be detected with high precision.

BRIEF DESCRIPTION OF THE DRAWINGS

In the accompanying drawings:

FIG. 5 is a timing chart showing transmission/reception of pulse wave of the radar system according to the first embodiment of the present invention;

FIG. 6 is a graph showing reflection coefficients and transmission coefficients with respect to changes of incident angle when a transmission wave transmitted from the antenna of the radar system is incident on the radome according to the first embodiment of the present invention;

DETAILED DESCRIPTION OF THE INVENTION

Figure 1:
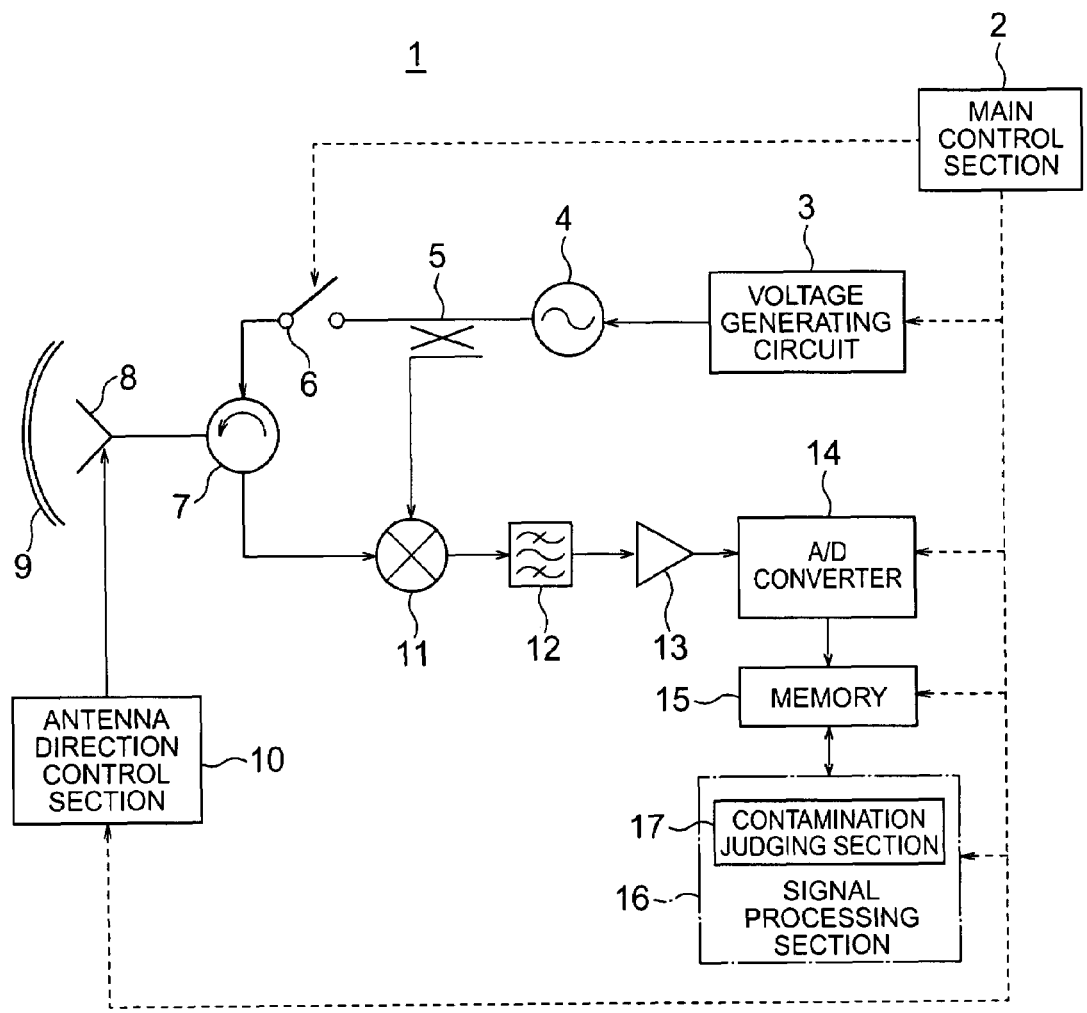
FIG. 1 is a block diagram showing a radar system according to a first embodiment of the present invention.

While preferred embodiments of the present invention will be explained below based on the drawings, identical or corresponding components and regions through out the drawings will be explained by denoting the same reference numerals.

It should be noted that the following embodiments will be explained on an assumption that a radar system 1 is mounted in a vehicle.

FIRST EMBODIMENT

FIG. 1 is a block diagram showing the radar system 1 of a first embodiment of the present invention.

In FIG. 1, the radar system 1 has a main control section 2, a voltage generating circuit 3, a voltage controlled oscillator (abbreviated as VCO herein after) 4, a distributor 5, a transmission switch 6, a circulator 7, an antenna 8, a radome 9, an antenna direction control section 10, a mixer 11, a band pass filter (abbreviated as BPF herein after) 12, an amplifier 13, an analog to digital (A/D) converter 14, a memory 15, and a signal processing section (signal processing means) 16.

The main control section 2 controls operations of the radar system 1 by outputting main control signals such as timing signals to the voltage generating circuit 3, the transmission switch 6, the antenna direction control section 10, the A/D converter 14, the memory 15, and the signal processing section 16.

Figure 2:
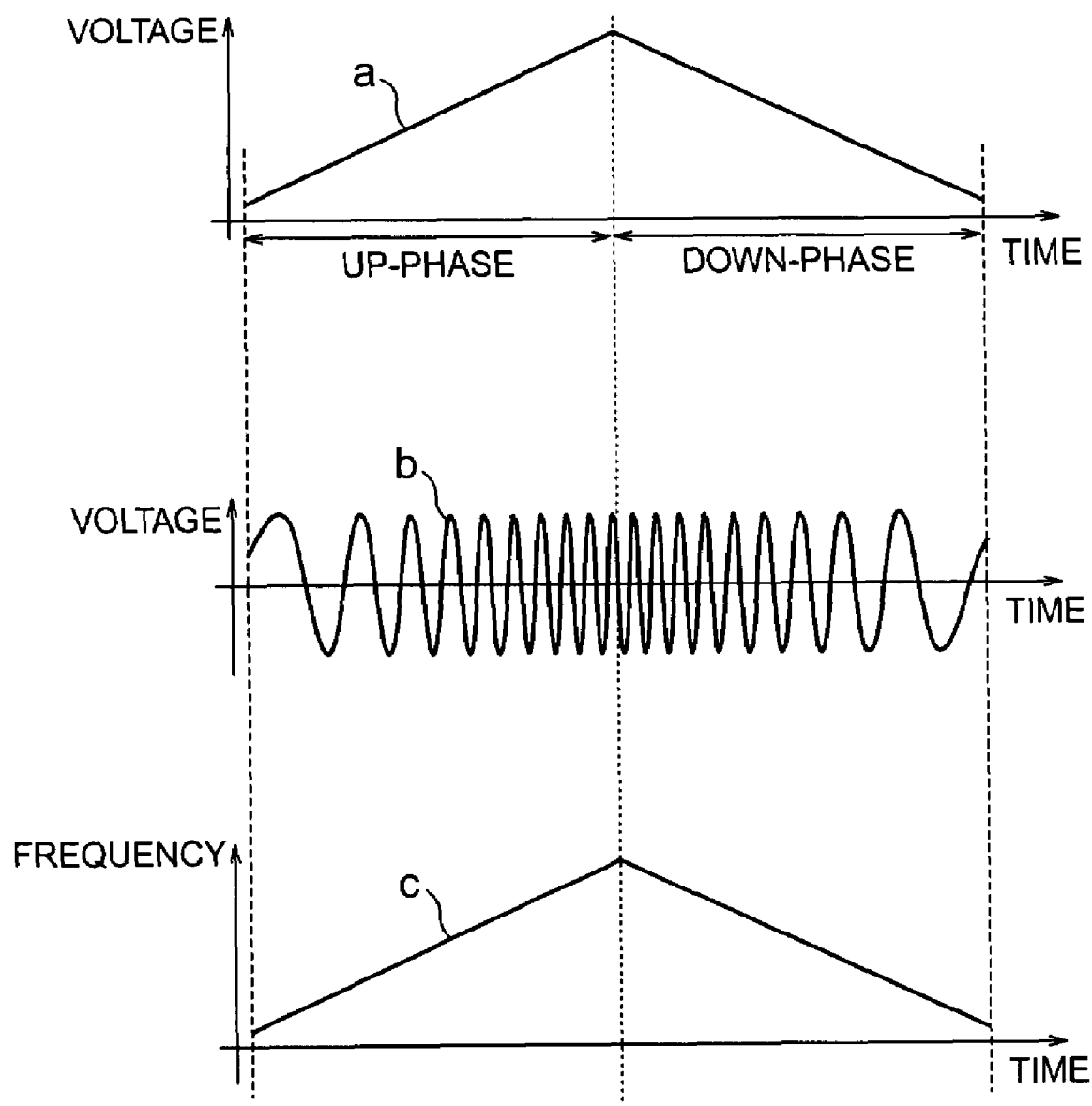
FIG. 2 is a timing chart showing changes of voltage and frequency of various signals generated from a voltage generating circuit or a VCO of the radar system according to the first embodiment of the present invention.

FIG. 2 is a timing chart showing changes of voltage or frequency of various signals generated from the voltage generating circuit 3 and the VCO 4 of FIG. 1.

The voltage generating circuit 3 generates voltage "a" changing temporally in a shape of triangular wave (see FIG. 2) and applies the voltage "a" to the VCO 4 under the control of the main control signal from the main control section 2.

The voltage "a" has an up-phase in which its value increases as time elapses and a down-phase in which the value decreases as time elapses. The voltage repeats the up-phase and down-phase alternately in equal time width in each phase.

In response to the voltage "a" applied by the voltage generating circuit 3, the VCO 4 generates a frequency modulated continuous wave (FMCW) signal whose oscillating frequency changes temporally and outputs the FMCW signal to the distributor 5. The FMCW signal is a signal whose voltage with respect to time changes as voltage "b" (see FIG. 2) and whose frequency with respect to time changes as frequency "c" (see FIG. 2).

The distributor 5 outputs part of the FMCW signal inputted from the VCO 4 to the transmission switch 6 as a transmission signal and the remaining part of the FMCW signal to the mixer 11 as a local signal.

The transmission switch 6 is turned on/off by the main control signal outputted from the main control section 2. The transmission switch 6 modulates pulses of the transmission signal inputted from the distributor 5 and outputs the transmission signal to the antenna 8 via the circulator 7 that changes over advancing directions of a transmitting signal.

The antenna 8 transmits the transmission signal whose pulse has been modulated and which has been inputted from the circulator 7 as a transmission wave (electromagnetic wave) to the peripheral are a through the radome 9 made of resin for protecting the antenna 8.

Here, the antenna 8 is used to both transmit and receive signals. The antenna direction control section 10 directs the antenna 8 to a plurality of different directions by receiving the main control signal from the main control section 2 in synchronism with the generation of the voltage "a" generated by the voltage generating circuit 3.

Figure 3:
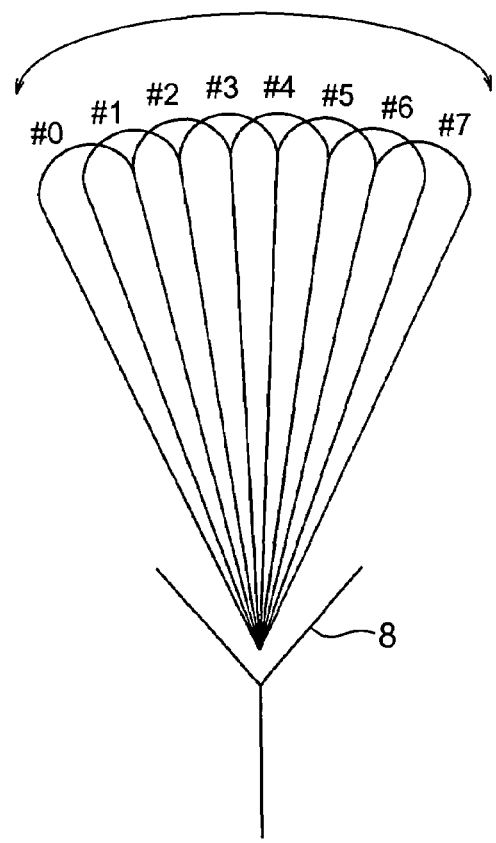
FIG. 3 is an explanatory diagram showing directions of transmission wave transmitted from an antenna of the radar system according to the first embodiment of the present invention.

At this time, the direction of the transmission wave transmitted from the antenna 8 changes to eight directions from a beam #0 to a beam #7, for example, as shown in FIG. 3 in conjunction with the direction of the antenna 8.

FIG. 3 is an explanatory diagram showing the directions of the transmission wave transmitted from the antenna 8 of FIG. 1.

It should be noted that the plurality of beams may be transmitted at the same time or the transmission wave may be changed over by using a switch, instead of transmitting the transmission wave while changing the direction of the antenna 8.

The radome 9 is provided for an exterior such as a bumper of the vehicle not shown. A metal film (reflecting section) 18 is formed on the surface of the radome 9 in a predetermined direction (e.g., in a direction of the beam #0) with respect to the antenna 8 as shown in FIG. 4.

Figure 4:
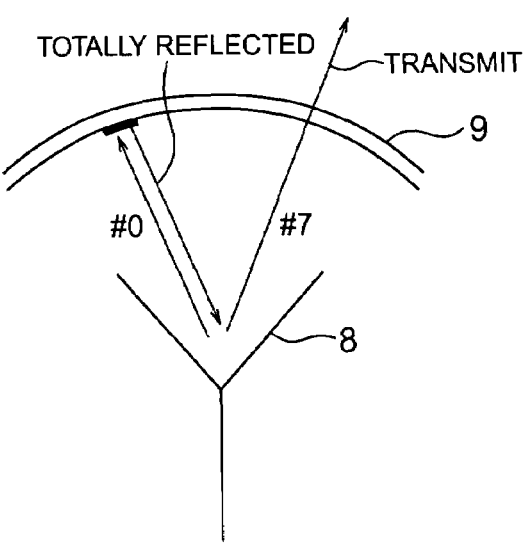
FIG. 4 is a structural diagram showing a radome of the radar system together with the antenna according to the first embodiment of the present invention.

FIG. 4 is a structural diagram showing the radome 9 together with the antenna 8.

It should be noted that the pertinent part of the radome 9 may be formed by metal instead of forming the metal film 18 on the surface of the radome 9.

FIG. 5 is a timing chart showing transmission/reception of the pulse wave of the radar system 1 according to the first embodiment of the present invention.

FIG. 5 shows the first transmission wave having a time width Tg, the reflected wave reflected by an object, the be at signal generated in receiving the reflected wave, and distance gates (sample point) "0 through n" having the same time width with the time width Tg of the transmission wave, in connection with each other with an axis of abscissa representing time.

The transmission wave (see FIG. 5) that is a pulse wave of the time width Tg transmitted from the antenna 8 is reflected by the object when the object exists within a transmission range, is received by the antenna 8 as the reflected wave (see FIG. 5) with a delay time τ corresponding to a distance R to the object, and is outputted to the circulator 7 as the received signal.

The circulator 7 changes over the advancing direction of the received signal and outputs the received signal to the mixer 11.

The mixer 11 generates a be at signal (see FIG. 5) by mixing the local signal inputted from the distributor 5 and the received signal inputted from the circulator 7 and outputs the be at signal to the BPF 12.

The BPF 12 removes unnecessary frequency components of the be at signal outputted from the mixer 11 and outputs the be at signal to the amplifier 13. The amplifier 13 amplifies the be at signal outputted from the BPF 12 and outputs the be at signal to the A/D converter 14.

The A/D converter 14 receives the be at signal for each distance gate in synchronism with an observation period of the up-phase or down-phase of the voltage "a" under the control of the main control signal from the main control section 2, and outputs the be at signal to the memory 15 as a digital signal value.

The memory 15 turns to a write mode in synchronism with the observation period of the up-phase or down-phase of the voltage "a" under the control of the main control signal from the main control section 2, and stores the digital signal value of the be at signal inputted from the A/D converter 14. When the observation period of the up-phase or down-phase ends, the memory 15 turns to a readable mode in which the stored digital signal value can be read, under the control of the main control signal from the main control section 2.

At the point of time when the observation period of the up-phase or down-phase ends, the signal processing section 16 reads the digital signal value of the be at signal in the up-phase or down-phase from the memory 15, calculates the distance R to the object, the relative speed with the object, and the azimuth of the object, and outputs the calculation results to an external device (not shown) such as a motion control device and a display device of a movable body.

The signal processing section 16 is configured by a CPU (Central Processing Unit) or a CPU and a DSP (Digital Signal Processor).

Here, the signal processing section 16 has a contamination judging section 17 (contamination judging means) for judging contamination adhering to the radome 9.

Operations of the contamination judging section 17 in judging contamination adhering to the radome 9 will be explained below with reference to FIG. 4 and FIGS. 6 through 8.

First, reflection characteristics of the transmission wave against the radome 9 when the radome 9 is installed vertically with respect to each direction of the antenna 8 will be explained. At this time, it is supposed that a thickness of the radome 9 is 3.39 mm, its dielectric constant is 3.00, and its dielectric loss tangent (tan δ) is 0.003.

FIG. 6 is a graph showing reflection coefficients and transmission coefficients with respect to changes of incident angle when the transmission wave (vertical and horizontal polarizedwaves) transmitted from the antenna 8 of FIG. 1 is incident on the radome 9. An axis of abscissa of this graph represents the incident angle [deg] of the transmission wave and an axis of ordinate represents the reflection coefficient [dB] and the transmission coefficient [dB].

In FIG. 6, it is indicated that when the incident angle of the transmission wave is 0 deg, for example, the transmission wave incident on the radome 9 mostly transmits because the transmission coefficient is almost 0 dB and the reflection coefficient is −40 dB.

In other words, the beam #0 is totally reflected by the metal film 18 formed on the radome 9 and the other beams #1 through #7 transmit through the radome 9.

Next, the reflection characteristics of the transmission wave against the radome 9 when contamination, e.g., a film of water, is adhering to the surface of the radome 9 will be explained. At this time, it is supposed that a thickness of the film of water is 0.1 mm, its dielectric constant is 22.0, and its dielectric loss tangent (tan δ) is 2.4.

Figure 7:
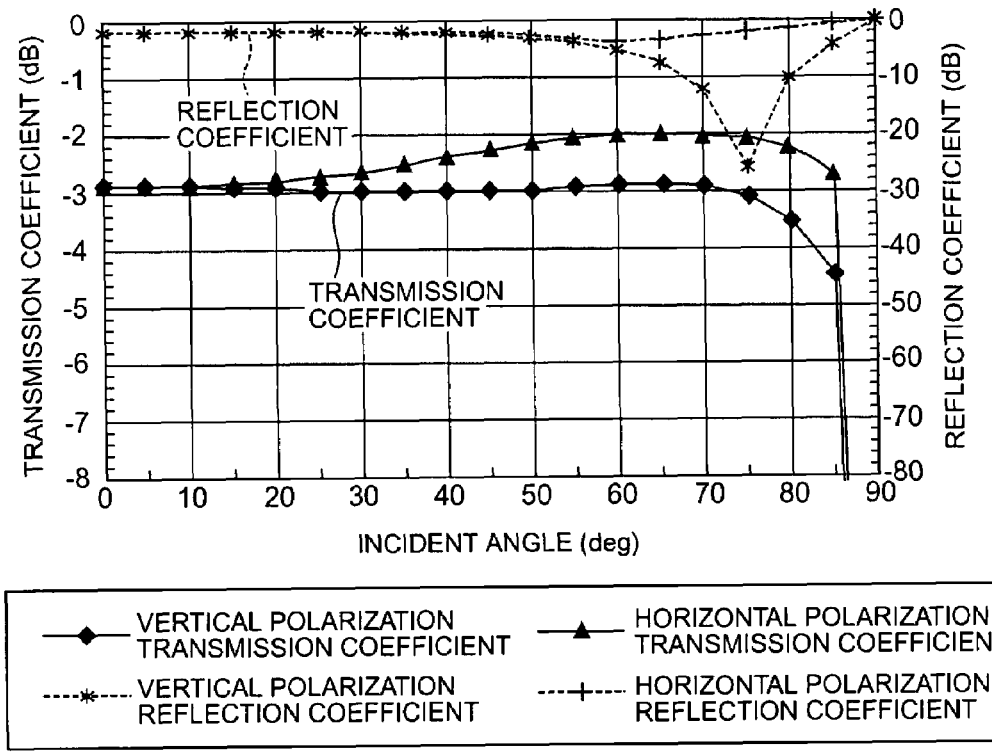
FIG. 7 is a graph showing reflection coefficients and transmission coefficients with respect to changes of the incident angle when a transmission wave transmitted from the antenna of the radar system is incident on the radome having a film of water adhering thereto according to the first embodiment of the present invention.

FIG. 7 is a graph showing reflection coefficients and transmission coefficients with respect to changes of incident angle when the transmission wave (vertical and horizontal polarized waves) transmitted from the antenna 8 of FIG. 1 is incident on the radome 9 having the film of water adhering thereto. An axis of abscissa of this graph represents the incident angle [deg] of the transmission wave and an axis of ordinate represents the reflection coefficient [dB] and the transmission coefficient [dB].

Figure 8:
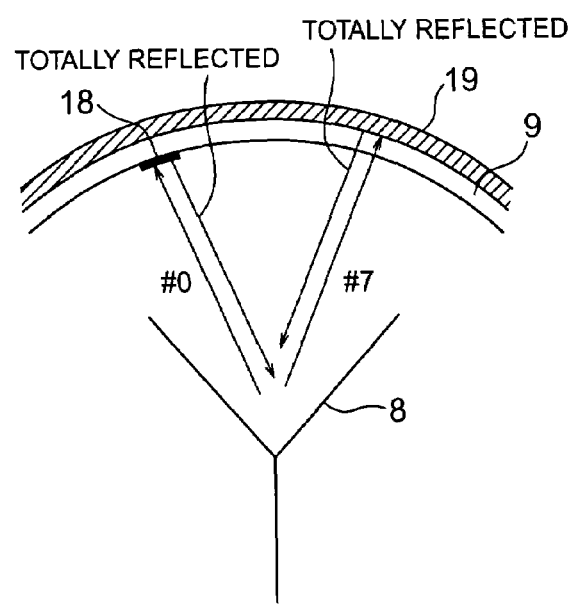
FIG. 8 is a structural diagram showing the radome of the radar system having a film of water adhering thereto, together with the antenna, according to the first embodiment of the present invention.

FIG. 8 is a structural diagram showing the radome 9 of FIG. 1 having the film of water 19 adhering thereto.

In FIG. 7, it is indicated that when the incident angle of the transmission wave is 0 deg, for example, the transmission wave incident on the radome 9 is mostly reflected because the transmission coefficient is around −14 dB and the reflection coefficient is around −2 dB.

In other words, the beam #0 is totally reflected by the metal film 18 and is received by the antenna 8 and the other beams #1 through #7 are totally reflected by the film of water 19 adhering to the radome 9 and are received by the antenna 8.

Accordingly, by utilizing the reflection characteristics described above, the contamination judging section 17 calculates a deviation D1 between the reception level of the reflected wave from the metal film 18 in a predetermined direction (direction of the beam #0) and the reception level of the reflected wave from directions other than the predetermined direction (directions of the beams #1 through #7) and judges the contamination adhering to the radome 9 based on the calculated deviation D1.

Figure 9:
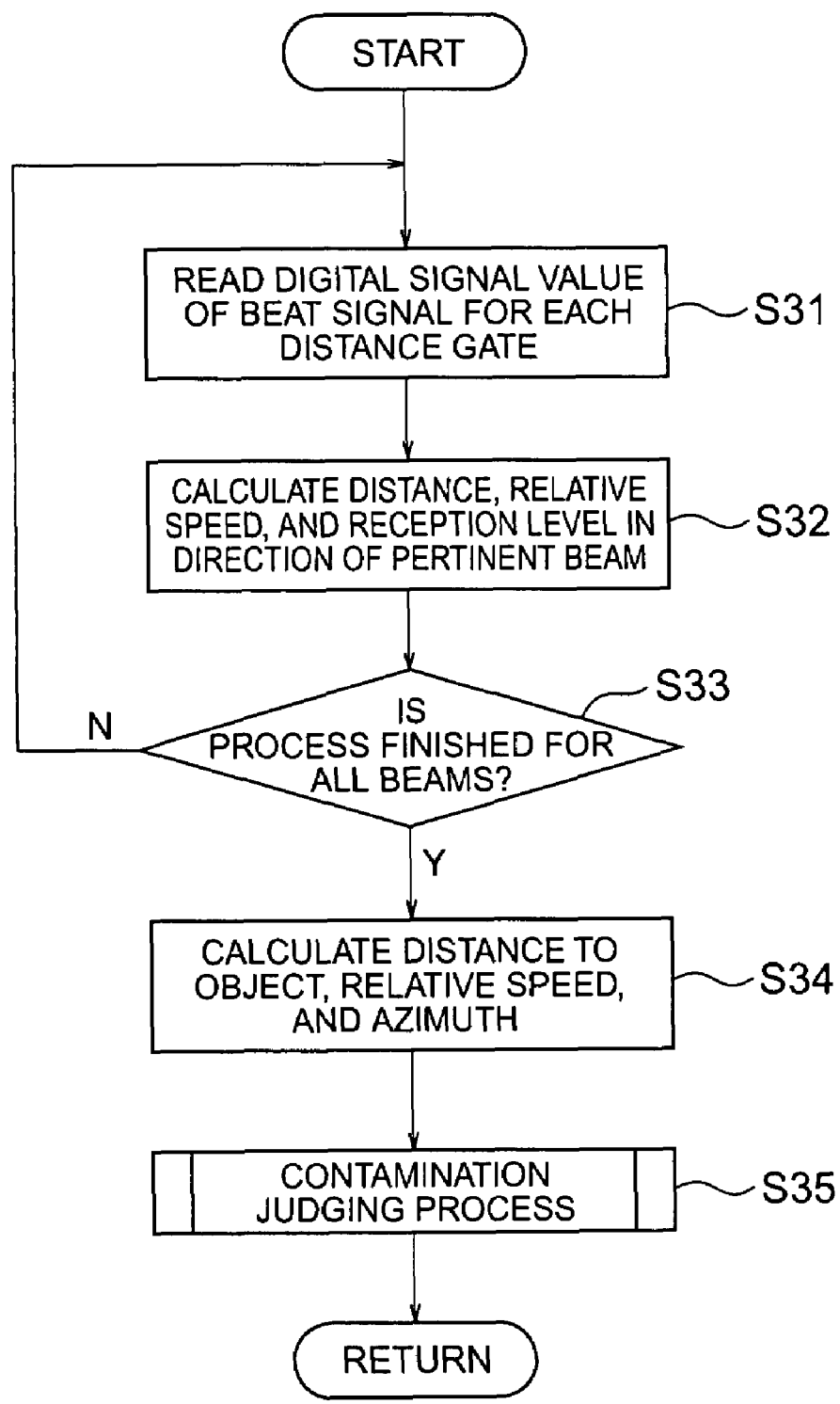
FIG. 9 is a flowchart for explaining operations of a signal processing section of the radar system according to the first embodiment of the present invention.

The operation of the signal processing section 16 of the radar system 1 according to the first embodiment of the present invention will be explained below with reference to a flowchart of FIG. 9 together with FIGS. 1 through 8.

First, the signal processing section 16 reads the digital signal value of the be at signal in the up-phase or down-phase for each distance gate (Step S31).

Then, the signal processing section 16 calculates the distance to the object, relative speed with the object, and the reception level of the reflected wave in a direction of the pertinent beam based on the read digital signal value of the be at signal (Step S32).

Next, the signal processing section 16 judges whether or not the process of Step S32 has been finished for all of the beams #0 through #7 (Step S33).

When the signal processing section 16 judges in Step S33 that the process has not been finished for all of the beams (i.e., No), it shifts the process immediately to Step S31.

When the signal processing section 16 judges in Step S33 that the process has been finished for all of the beams (i.e., Yes), it selects data of the same distance and relative speed from calculation data in a plurality of directions calculated in Step S32 and calculates an azimuth of the object based on a relationship of strength of the reception levels (Step S34).

Next, the contamination judging section 17 executes a process for judging contamination (Step S35). Thus, the process of FIG. 9 ends.

Figure 10:
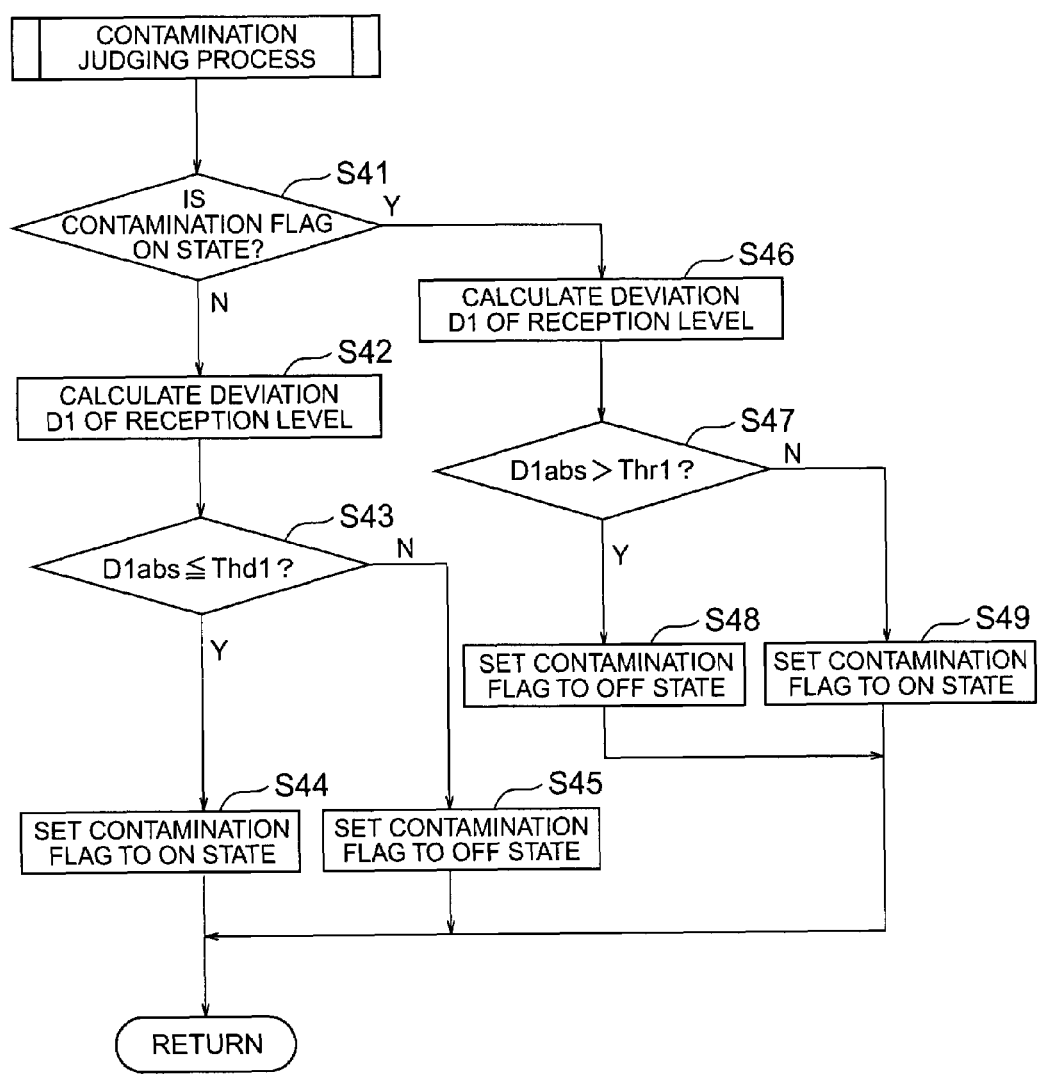
FIG. 10 is a flowchart for explaining operations of a contamination judging section of the radar system according to the first embodiment of the present invention.

Next, the operation of the contamination judging section 17 of the radar system 1 according to the first embodiment of the present invention will be explained in detail below with reference to a flowchart of FIG. 10 together with FIGS. 1 through 9. Here, a case of judging contamination adhering in the direction of the beam #7 will be exemplified.

First, the contamination judging section 17 judges whether or not a contamination flag provided within the contamination judging section 17, for indicating whether or not there exists contamination is ON (rising state) (Step S41).

When the contamination judging section 17 judges in Step S41 that the contamination flag is OFF (i.e., No), it calculates the deviation D1 of the reception level of the reflected wave by subtracting the digital signal value of the be at signal in a close distance gate of the beam #7 from the digital signal value of the be at signal in a close distance gate of the beam #0 (Step S42).

Here, the close distance gate is a distance gate having a short distance (having a smaller value) among the respective distance gates shown in FIG. 5.

Next, the contamination judging section 17 judges whether or not an absolute value D1abs of the deviation D1 of the reception level calculated in Step S42 is equal to or smaller than a contamination judging threshold value Thd1 (predetermined criterion threshold value) set in advance (Step S43).

When the contamination judging section 17 judges in Step S43 that the absolute value D1abs of the deviation D1 is equal to or smaller than the contamination judging threshold value Thd1 (i.e., Yes), it sets the contamination flag ON by assuming that the radome 9 is contaminated and the beam #7 is totally reflected (Step S44). Then, the process of FIG. 10 ends.

When the contamination judging section 17 judges in Step S43 that the absolute value D1abs of the deviation D1 is larger than the contamination judging threshold value Thd1 (i.e., No), in contrary, it sets the contamination flag OFF by assuming that the radome 9 is not contaminated and the beam #7 is transmitting through the radome 9 (Step S45). Then, the process of Step 10 ends.

When the contamination judging section 17 judges in Step S41 that the contamination flag is ON (i.e., Yes), it calculates the deviation D1 of the reception level of the reflected wave by subtracting the digital signal value of the be at signal in the close distance gate of the beam #7 from the digital signal value of the be at signal in the close distance gate of the beam #0 (Step S46).

Next, the contamination judging section 17 judges whether or not the absolute value D1abs of the deviation D1 of the reception level calculated in Step S46 is larger than a contamination recovery threshold value Thr1 set in advance (Step S47).

When the contamination judging section 17 judges in Step S47 that the absolute value D1abs of the deviation D1 is larger than the contamination recovery threshold value Thr1 (i.e., Yes), it sets the contamination flag OFF by assuming that the contamination on the radome 9 is removed and the beam #7 is transmitting through the radome 9 (Step S48). Then, the process of FIG. 10 ends.

When the contamination judging section 17 judges in Step S47 that the absolute value D1abs of the deviation D1 is equal to or smaller than the contamination recovery threshold value Thr1 (i.e., No), it sets the contamination flag ON by assuming that the radome 9 is still contaminated and the beam #7 is totally reflected (Step S49). Then, the process of FIG. 10 ends.

According to the radar system 1 of the first embodiment of the present invention, the metal film 18 is formed on the surface of the radome 9 provided for the exterior of the vehicle, in the predetermined direction (direction of the beam #0) with respect to the antenna 8; and the contamination judging section 17 judges the contamination on the radome 9 by calculating the deviation D1 between the reception level of the reflected wave from the metal film 18 in the predetermined direction and the reception level of the reflected wave from the directions other than the predetermined direction (directions of the beams #1 through #7) and by comparing the absolute value D1abs of the deviation D1 with the contamination judging threshold value Thd1.

Therefore, it is not necessary to provide maps of criterion values by considering temperature characteristics of each radar system 1 and hence it is possible to cut the adjustment costs.

Still more, even when the radome 9 is contaminated during when the radar system 1 is in a halt, the contamination adhering to the radome 9 can be detected with high precision because the contamination on the radome 9 is judged based on the deviation D1 between the reception level of the reflected wave from the metal film 18 in the predetermined direction and the reception level of the reflected wave from the directions other than the predetermined direction after when the radar system 1 is started.

Still more, because the contamination judging section 17 judges the contamination on the radome 9 when the absolute value D1abs of the deviation D1 is equal to or smaller than the contamination judging threshold value Thd1, it can be prevented from erroneously judging that the radome 9 is contaminated when the radome 9 is not contaminated and the reception level of the reflected wave is changed due to noise or like.

It should be noted that although the contamination judging section 17 of the first embodiment judges the contamination on the radome 9 in the direction of the beam #7, the direction is not limited to this.

The contamination judging section 17 may judge the contamination on the radome 9 in the same manner as described above also in the respective directions of the beams #1 through #6. The contamination judging section 17 may judge the contamination on almost whole surface of the radome 9 by sequentially changing the beam directions.

SECOND EMBODIMENT

Figure 11:
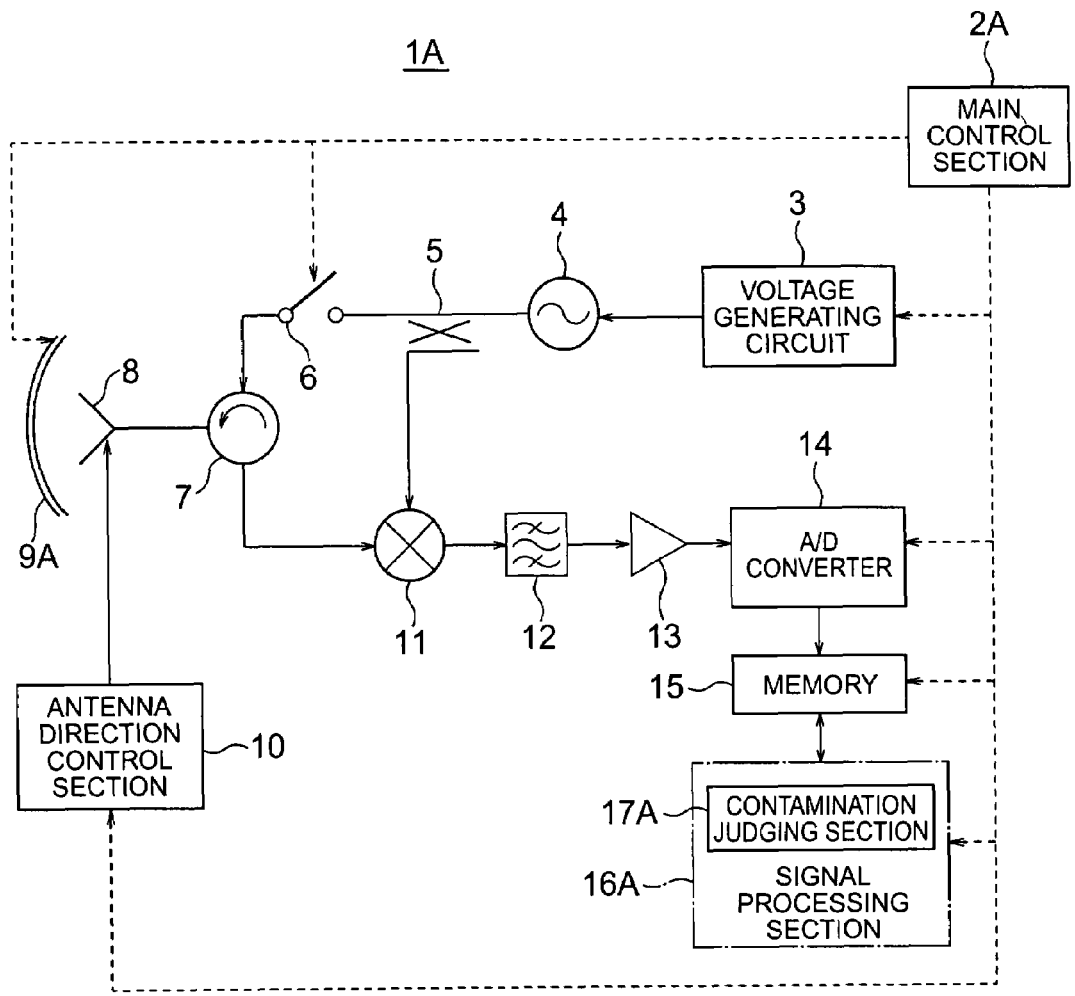
FIG. 11 is a block diagram showing a radar system according to a second embodiment of the present invention.

FIG. 11 is a block diagram showing a radar system 1A of a second embodiment of the present invention.

In FIG. 11, the radar system 1A has a main control section 2A, a radome 9A, and a signal processing section 16A (contamination judging section 17A) instead of the main control section 2, the radome 9, and the signal processing section 16 (contamination judging section 17) shown in FIG. 1.

Although the metal film 18 is formed in the predetermined direction with respect to the antenna 8 in the radome 9 of the first embodiment as shown in FIG. 4, the structure is not limited to this.

The radome 9A may be made of a liquid crystal layer 20, holding layers 21 for holding the liquid crystal layer 20, and control electrode layers 22 for applying electric field to the liquid crystal layer 20.

Figure 12:
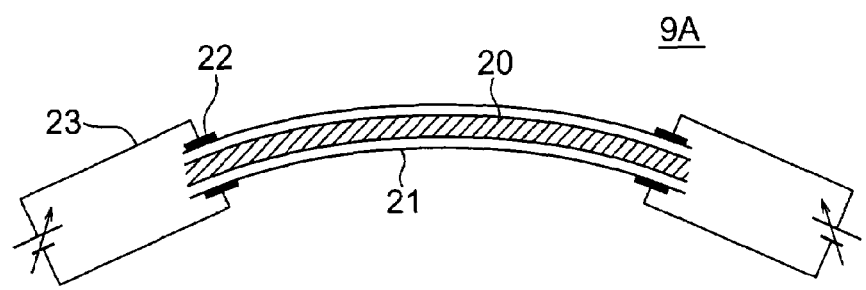
FIG. 12 is a structural diagram of a radome of the radar system according to the second embodiment of the present invention.

FIG. 12 is a structural diagram of the radome 9A of FIG. 11.

In FIG. 12, the liquid crystal layer 20 is sandwiched by the holding layers 21. The control electrode layers 22 are connected to power supply circuits 23 and apply the electric field to the liquid crystal layer 20 when they are energized at predetermined timing set in advance under the control of the main control signal from the main control section 2A of FIG. 11.

The electric field is generated when the control electrode layers 22 are energized (when voltage is applied to the control electrode layers 22). A dielectric constant of the liquid crystal layer 20 changes due to this electric field.

It should be noted that the state where the electric field is applied to the liquid crystal layer 20 and when the dielectric constant thereof changes is called as a field controlled state (field controlled time) of the liquid crystal layer 20. A state where no electric field is applied to the liquid crystal layer 20 is called as a non-controlled state (non-controlled time) of the liquid crystal layer 20.

Here, a thickness "d" of the liquid crystal layer 20 may be expressed by the following equation (1), where relative dielectric constant of the liquid crystal layer 20 is $\in r$, an incident angle of the transmission wave to the radome 9A is $\theta in$, a natural number is N, and a free space wavelength of the transmission wave is $\lambda 0$.

$$d = \frac{N\lambda 0}{2\sqrt{\varepsilon r - \sin^2 \theta in}} \quad (1)$$

In the equation (1), transmittance of the transmission wave incident on the radome 9A when the liquid crystal layer 20 is in the non-controlled time may be improved by setting the thickness "d" of the liquid crystal layer 20 by using the relative dielectric constant $\in rnc$ of the liquid crystal layer 20 in the non-controlled time. At this time, the transmittance of the transmission wave incident on the radome 9A in the field controlled time of the liquid crystal layer 20 drops and the transmission wave is almost totally reflected by the surface of the liquid crystal layer 20.

Then, the liquid crystal layer 20 should be put in the non-controlled state to transmit the transmission wave, and the liquid crystal layer 20 should be put in the field controlled state to reflect the transmission wave.

Accordingly, the contamination judging section 17A calculates a deviation D2 between the reception level of the reflected wave when the liquid crystal layer 20 is in the field controlled state and the reception level of the reflected wave when the liquid crystal layer 20 is in the non-controlled state, and judges contamination on the radome 9A based on the deviation D2 thus calculated.

The other structures are the same as those of the first embodiment described above, so their explanations will be omitted here.

Figure 13:
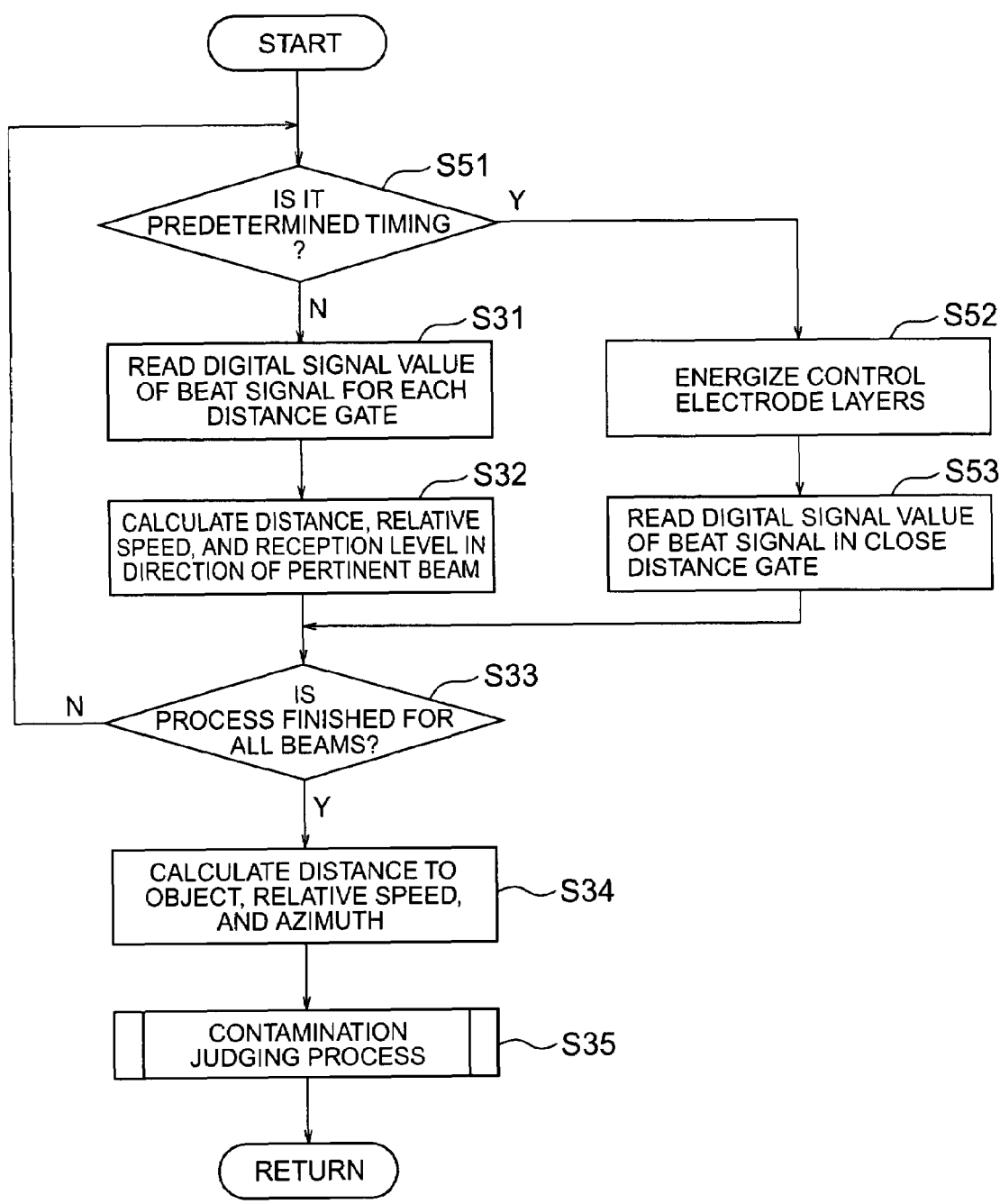
FIG. 13 is a flowchart for explaining operations of a signal processing section of the radar system according to the second embodiment of the present invention.

The operation of the signal processing section 16A of the radar system 1A according to the second embodiment of the present invention will be explained below with reference to a flowchart of FIG. 13 together with FIGS. 11 and 12.

It should be noted that the same operation as that of the first embodiment will not be explained.

First, the signal processing section 16A judges whether or not it is predetermined timing at which the control electrode layers 22 are energized (Step S51).

When the signal processing section 16A judges in Step S51 that it is not the predetermined timing (i.e., No), the signal processing section 16A shifts to Step S31 described before.

When the signal processing section 16A judges in Step S51 that it is the predetermined timing (i.e., Yes), electricity is fed to the control electrode layers 22 to put the liquid crystal layer 20 into the field controlled state (Step S52).

Next, the signal processing section 16A reads the digital signal value of the be at signal in the close distance gate (Step S53), and shifts to Step S33 described before.

When the signal processing section 16A judges in Step S33 that the process has been finished for all of the beams (i.e., Yes), it shifts to Step S34 described before.

When the signal processing section 16A judges in Step S33 that the process has not been finished for all of the beams (i.e., No), it immediately shifts to Step S51.

Next, the operation of the contamination judging section 17A of the radar system 1A according to the second embodiment of the present invention will be explained below in detail with reference to a flowchart of FIG. 14 together with FIGS. 11 through 13.

The contamination judging section 17A judges first whether or not the contamination flag provided within the contamination judging section 17A, for indicating whether or not the radome 9A is contaminated is ON (rising state) (Step S61).

When the contamination judging section 17A judges in Step S61 that the contamination flag is OFF (i.e., No), the contamination judging section 17A calculates the deviation D2 of the reception level of the reflected wave by subtracting the digital signal value of the be at signal in the close distance gate when the liquid crystal layer 20 is in the non-controlled state from the digital signal value of the be at signal in the close distance gate when the liquid crystal layer 20 is in the field controlled state (Step S62).

Next, the contamination judging section 17A judges whether or not the absolute value D2abs of the deviation D2 of the reception level calculated in Step 62 is equal to or smaller than a contamination judging threshold value Thd2 (predetermined criterion threshold value) set in advance (Step S63).

When the contamination judging section 17A judges in Step S63 that the absolute value D2abs of the deviation D2 is equal to or smaller than the contamination judging threshold value Thd2 (i.e., Yes), it counts up a contamination judging counter provided within the contamination judging section 17A by assuming that the radome 9A is contaminated and the transmission wave is totally reflected when the liquid crystal layer 20 is in the non-controlled time (Step S64).

When the contamination judging section 17A judges in Step S63 that the absolute value D2abs of the deviation D2 is larger than the contamination judging threshold value Thd2 (i.e., No), in contrary, it clears the contamination judging counter by assuming that the radome 9A is not contaminated and the transmission wave transmits through the radome 9A when the liquid crystal layer 20 is in the non-controlled time (Step S65).

Next, the contamination judging section 17A judges whether or not a counter value Cd of the contamination judging counter is larger than a contamination judging counter threshold value Thdt (predetermined time) set in advance (Step S66).

Figure 14:
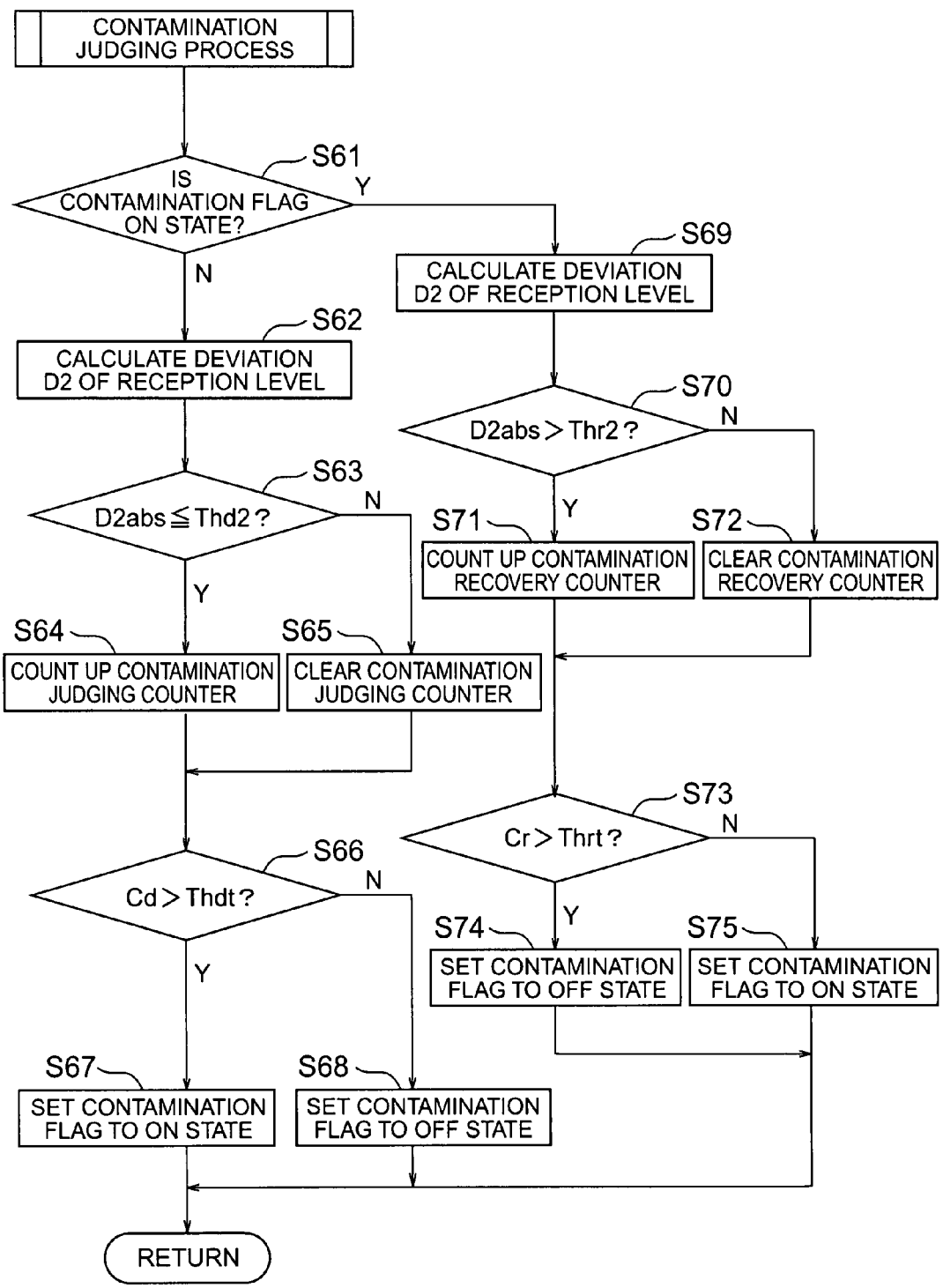
FIG. 14 is a flowchart for explaining operations of a contamination judging section of the radar system according to the second embodiment of the present invention.

When the contamination judging section 17A judges in Step S66 that the counter value Cd is larger than the contamination judging counter threshold value Thdt (i.e., Yes), it sets the contamination flag ON (Step S67), and ends the process of FIG. 14.

When the contamination judging section 17A judges in Step S66 that the counter value Cd is equal to or smaller than the contamination judging counter threshold value Thdt (i.e., No), in contrary, it sets the contamination flag OFF (Step S68), and ends the process of FIG. 14.

When the contamination judging section 17A judges in Step S61 that the contamination flag is ON (i.e., Yes), it calculates the deviation D2 of the reception level of the reflected wave by subtracting the digital signal value of the be at signal in the close distance gate when the liquid crystal layer 20 is in the non-controlled time from the digital signal value of the be at signal in the close distance gate when the liquid crystal layer 20 is in the field controlled time (Step S69).

Then, the contamination judging section 17A judges whether or not the absolute value D2abs of the deviation D2 of the reception level calculated in Step 69 is larger than the contamination recovery threshold value Thr2 set in advance (Step S70).

When the contamination judging section 17A judges in Step S70 that the absolute value D2abs of the deviation D2 is larger than the contamination recovery threshold value Thr2 (i.e., Yes), it counts up a contamination recovery counter provided within the contamination judging section 17A by assuming that the contamination on the radome 9A has been removed and the transmission wave transmits through the radome 9A when the liquid crystal layer 20 is in the non-controlled time (Step S71).

When the contamination judging section 17A judges in Step S70 that the absolute value D2abs of the deviation D2 is equal to or smaller than the contamination recovery threshold value Thr2 (i.e., No), it clears the contamination recovery counter by assuming that the radome 9A is still contaminated and the transmission wave is totally reflected when the liquid crystal layer 20 is in the non-controlled time (Step S72).

Next, the contamination judging section 17A judges whether or not the counter value Cr of the contamination recovery counter is larger than the contamination recovery counter threshold value Thrt set in advance (Step S73).

When the contamination judging section 17A judges in Step S73 that the counter value Cr is larger than the contamination recovery counter threshold value Thrt (i.e., Yes), it sets the contamination flag OFF (Step S74), and ends the process of FIG. 14.

When the contamination judging section 17A judges in Step S73 that the counter value Cr is equal to or smaller than the contamination recovery counter threshold value Thrt (i.e., No), it sets the contamination flag ON (Step S75), and ends the process of FIG. 14.

According to the radar system 1A of the second embodiment of the present invention, the radome 9A provided for the exterior of the vehicle is made of the liquid crystal layer 20, the holding layers 21, and the control electrode layers 22; and the contamination judging section 17A judges the contamination on the radome 9A by calculating the deviation D2 between the reception level of the reflected wave when the liquid crystal layer 20 is in the field controlled state and the reception level of the reflected wave when the liquid crystal layer 20 is in the non-controlled state and by comparing the absolute value D2abs of the deviation D2 with the contamination judging threshold value Thd2.

Therefore, while it was unable to calculate the distance to the object in the predetermined direction in which the metal film 18 is formed in the first embodiment described above, it is possible to calculate the distance to the object in the directions of all the beams and to detect the contamination on the radome 9A without detracting the detecting range of the object in this embodiment.

Still more, because the contamination judging section 17A judges the contamination on the radome 9A when the absolute value D2abs of the deviation D2 is equal to or smaller than the contamination judging threshold value Thd2 and when the counter value Cd of the contamination judging counter is larger than the contamination judging counter threshold value Thdt, it can be prevented from erroneously judging that the radome 9A is contaminated when a film of water adhering to the radome 9A momentarily by a rainfall, for example.

It should be noted that although the direction of the beam when the liquid crystal layer 20 is in the field controlled time and that when the liquid crystal layer 20 is in the non-controlled time are not specifically defined in the second embodiment described above, it is possible to judge the contamination on the radome 9A by noticing on a beam set in advance or to sequentially change over the direction of a beam to be noticed.

The same effect of the second embodiment can be obtained also in those cases.

THIRD EMBODIMENT

Although the radome 9A of the second embodiment is made of the liquid crystal layer 20, the holding layers 21, and the control electrode layers 22 as shown in FIG. 12, the structure is not limited to this.

Figure 15:
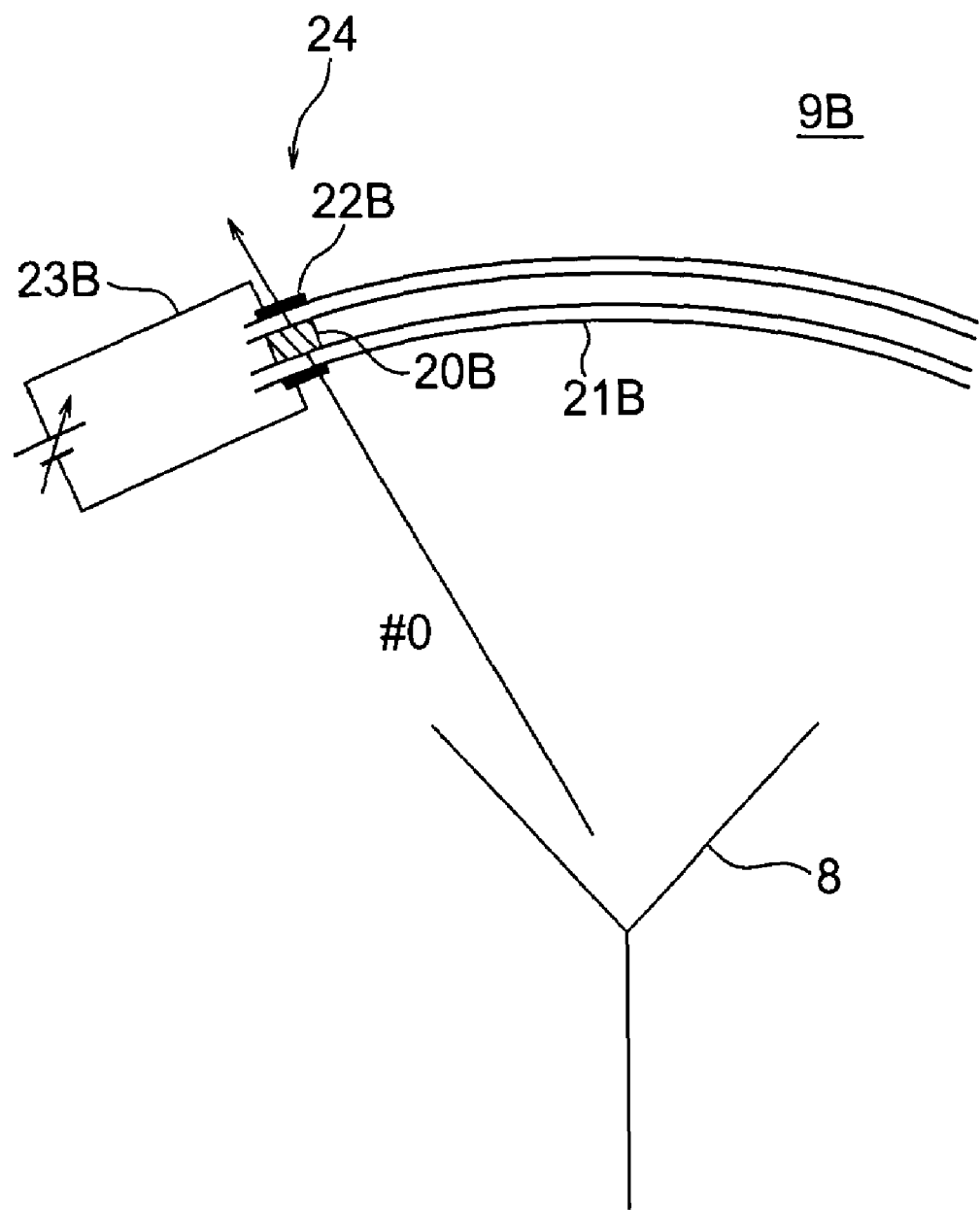
FIG. 15 is a structural diagram showing a radome of a radar system together with an antenna according to a third embodiment of the present invention.

A liquid crystal section 24 that includes a liquid crystal layer 20B, holding layers 21B, and control electrode layers 22B may be formed on a radome 9B in a predetermined direction (e.g., the direction of the beam #0) with respect to the antenna 8 as shown in FIG. 15.

Here, the same type of components as those in the second embodiment are denoted by the same reference numerals with "B" appended there after and their detailed explanations will be omitted.

FIG. 15 is a structural diagram showing the radome 9B of a radar system 1B (not shown) together with the antenna 8 according to a third embodiment of the present invention.

In FIG. 15, the liquid crystal layer 20B is sandwiched by the holding layers 21B. The control electrode layers 22B are connected to a power supply circuit 23B and apply electric field to the liquid crystal layer 20B when they are energized at predetermined timing set in advance under the control of the main control signal from the main control section 2B (not shown).

The contamination judging section 17B (not shown) calculates a deviation D3 between reception level of a reflected wave from the liquid crystal section 24 in the predetermined direction (direction of the beam #0) when the liquid crystal layer 20B is in the field controlled state and reception level of a reflected wave from directions (directions of the beams #1 through #7) other than the predetermined direction or of a reflected wave when the liquid crystal layer 20B is in the non-controlled state, and judges contamination on the radome 9B based on the calculated deviation D3.

The other structures are the same as those of the second embodiment described above and their explanations will be omitted here.

Here, the operation of the signal processing section 16B (not shown) of the radar system 1B according to the third embodiment of the present invention is also the same as that in the second embodiment described above, so its explanation will be omitted.

Figure 16:
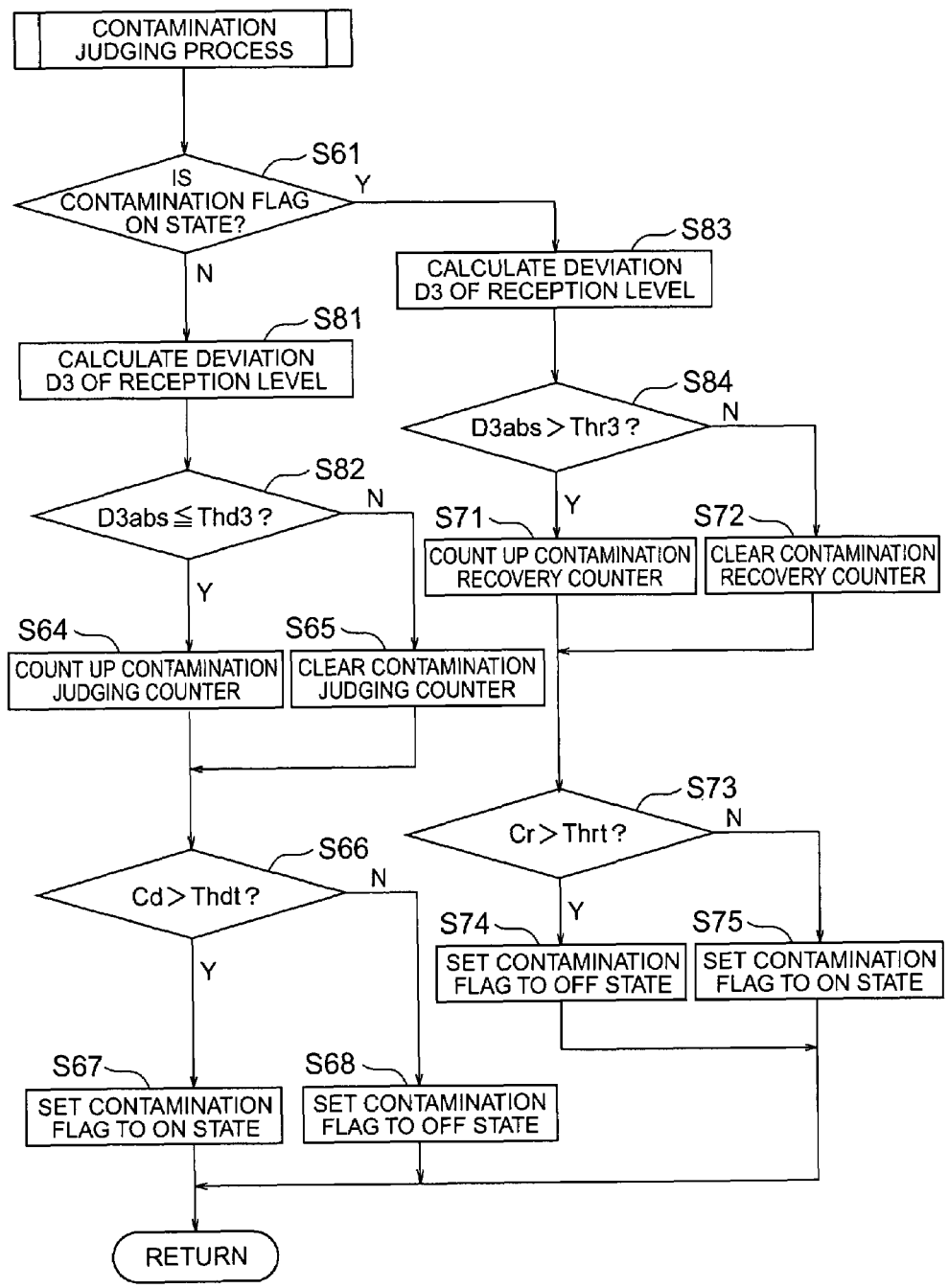
FIG. 16 is a flowchart for explaining operations of a contamination judging section of the radar system according to the third embodiment of the present invention.

Operations of the contamination judging section 17B of the radar system 1B according to the third embodiment of the present invention will be explained below in detail with reference to a flowchart of FIG. 16 together with FIG. 15.

It should be noted that an explanation of the same operations as in the second embodiment will be omitted here.

The contamination judging section 17B judges first whether or not the contamination flag provided within the contamination judging section 17B, for indicating whether or not the radome 9A is contaminated is ON (rising state) (Step S61).

When the contamination judging section 17B judges in Step S61 that the contamination flag is OFF (i.e., No), the contamination judging section 17B calculates the deviation D3 of the reception level of the reflected wave by subtracting the digital signal value of the be at signal in the close distance gate of the beam #M (where M is an either value among 1 through 7 when the liquid crystal layer 20B is in the field controlled state, and is an either value among 0 through 7 when the liquid crystal layer 20 B is in the non-controlled time. The value of M may be fixed to one value or may be sequentially changed) from the digital signal value of the be at signal in the close distance gate of the beam #0 when the liquid crystal layer 20 is in the field controlled state (Step S81).

Next, the contamination judging section 17B judges whether or not an absolute value D3abs of the deviation D3 of the reception level calculated in Step 81 is equal to or smaller than a contamination judging threshold value Thd3 (predetermined criterion threshold value) set in advance (Step S82).

When the contamination judging section 17B judges in Step S82 that the absolute value D3abs of the deviation D3 is equal to or smaller than the contamination judging threshold value Thd3 (i.e., Yes), it counts up a contamination judging counter provided within the contamination judging section 17B by assuming that the radome 9B is contaminated and the beam #M is totally reflected (Step S64).

When the contamination judging section 17B judges in Step S82 that the absolute value D3abs of the deviation D3 is larger than the contamination judging threshold value Thd3 (i.e., No), in contrary, it clears the contamination judging counter by assuming that the radome 9B is not contaminated and the beam #M transmits through the radome 9B (Step S65).

When the contamination judging section 17B judges in Step S61 that the contamination flag is ON (i.e., Yes), it calculates the deviation D3 of the reception level of the reflected wave by subtracting the digital signal value of the be at signal in the close distance gate of the beam #M (where M is any one of values of 1 through 7 when the liquid crystal layer 20B is in the field controlled state and is any one of values of 0 through 7 when the liquid crystal layer 20 B is in the non-controlled state. Its value may be fixed to one value or may be sequentially changed) from the digital signal value of the be at signal in the close distance gate of the beam #0 when the liquid crystal layer 20B is in the field controlled state (Step S83).

Then, the contamination judging section 17B judges whether or not the absolute value D3abs of the deviation D3 of the reception level calculated in Step 83 is larger than a contamination recovery threshold value Thr3 set in advance (Step S84).

When the contamination judging section 17B judges in Step S84 that the absolute value D3abs of the deviation D3 is larger than the contamination recovery threshold value Thr3 (i.e., Yes), it counts up a contamination recovery counter provided within the contamination judging section 17B by assuming that the contamination on the radome 9B has been removed and the beam #M transmits through the radome 9B (Step S71).

When the contamination judging section 17B judges in Step S84 that the absolute value D3abs of the deviation D3 is equal to or smaller than the contamination recovery threshold value Thr3 (i.e., No), it clears the contamination recovery counter by assuming that the radome 9B is still contaminated and the beam #M is totally reflected (Step S72).

According to the radar system 1B of the third embodiment of the present invention, the radome 9B in the exterior of the vehicle is provided with the liquid crystal section 24 having the liquid crystal layer 20B, the holding layers 21B, and the control electrode layers 22B in a predetermined direction (the direction of the beam #0) with respect to the antenna 8; and the contamination judging section 17B judges the contamination on the radome 9B by calculating the deviation D3 between the reception level of the reflected wave from the liquid crystal section 24 in the predetermined direction (the direction of the beam #0) when the liquid crystal layer 20B is in the field controlled state and the reception level of the reflected wave from the directions (direction of the beams #1 through #7) other than the predetermined direction or of the reflected wave when the liquid crystal layer 20B is in the non-controlled state and by comparing the absolute value D3abs of the deviation D3 with the contamination judging threshold value Thd3.

Therefore, while in the second embodiment described above, the distance to the object cannot be calculated when the liquid crystal layer 20 is in the field controlled state, it is possible to calculate the distance to the object in other directions than the predetermined direction (direction of the beam #0) even when the liquid crystal layer 20B is in the field controlled state.

Although the radomes 9, 9A, and 9B of the first through third embodiments are provided for the exterior of the vehicle, the present invention is not limited thereto and may be provided within a casing (not shown) covering the antenna 8.

This case brings about the same effects with the first through third embodiments.

Although the FM pulse method has been exemplified as a radar system in the first through third embodiments described above, the present invention is not limited to the case.

The same effect with the first through third embodiments can be obtained by using the reflected wave component from the close distance even when another radar system is used.

What is claimed is:

1. A radar system, comprising:
    an antenna for transmitting an electromagnetic wave in a plurality of different directions as a transmission wave and for receiving a reflected wave from an object;
    a radome for protecting the antenna; and
    signal processing means for calculating a distance to the object based on the transmission wave and reflected wave, wherein:
    the radome has a metallic reflecting section provided in a predetermined direction with respect to the antenna;
    the signal processing means has contamination judging means for judging contamination adhering to the radome; and
    the contamination judging means calculates a deviation between a reception level of the reflected wave from the reflecting section in the predetermined direction and a reception level of the reflected wave from directions other than the predetermined direction, and judges contamination adhering to the radome based on the deviation.

2. A radar system according to claim 1, wherein the contamination judging means judges the contamination adhering to the radome when the deviation is equal to or smaller than a predetermined judgment threshold value.

3. A radar system according to claim 1, wherein the contamination judging means judges the contamination adhering to the radome when a state in which the deviation is equal to or smaller than a predetermined judgment threshold value continues for a predetermined period of time.

4. A radar system according to claim 1, wherein the radome is provided for an exterior of a vehicle.

5. A radar system according to claim 1, wherein the radome is provided for a casing which covers the antenna.

6. A radar system, comprising:
    an antenna for transmitting an electromagnetic wave in a plurality of different directions as a transmission wave and for receiving a reflected wave from an object;
    a radome for protecting the antenna; and
    signal processing means for calculating a distance to the object based on the transmission wave and reflected wave, wherein the radome has a liquid crystal layer, a holding layer for holding the liquid crystal layer, and a control electrode layer for applying an electric field to the liquid crystal layer when electricity is energized at a predetermined timing;
    the signal processing means has contamination judging means for judging contamination adhering to the radome; and
    the contamination judging means calculates a deviation between a reception level of the reflected wave when electricity is energized to the control electrode layer and a reception level of the reflected wave when no electricity is energized to the control electrode layer, and judges contamination adhering to the radome based on the deviation.

7. A radar system according to claim 6, wherein the contamination judging means judges the contamination adhering to the radome when the deviation is equal to or smaller than a predetermined judgment threshold value.

8. A radar system according to claim 6, wherein the contamination judging means judges the contamination adhering to the radome when a state in which the deviation is equal to or smaller than a predetermined judgment threshold value continues for a predetermined period of time.

9. A radar system according to claim 6, wherein the radome is provided for an exterior of a vehicle.

10. A radar system according to claim 6, wherein the radome is provided for a casing which covers the antenna.

11. A radar system, comprising:
    an antenna for transmitting an electromagnetic wave in a plurality of different directions as a transmission wave and for receiving a reflected wave from an object;
    a radome for protecting the antenna; and
    signal processing means for calculating a distance to the object based on the transmission wave and reflected wave, wherein:
    the radome has a liquid crystal section including a liquid crystal layer provided in a predetermined direction with respect to the antenna, a holding layer for holding the liquid crystal layer, and a control electrode layer for applying an electric field to the liquid crystal layer when electricity is energized at a predetermined timing;
    the signal processing means has contamination judging means for judging contamination adhering to the radome; and
    the contamination judging means calculates a deviation between a reception level of the reflected wave from the liquid crystal section in the predetermined direction when electricity is energized to the control electrode layer and a reception level of one of the reflected wave from directions other than the predetermined direction and the reflected wave when no electricity is energized to the control electrode layer, and judges contamination adhering to the radome based on the deviation.

12. A radar system according to claim 11, wherein the contamination judging means judges the contamination adhering to the radome when the deviation is equal to or smaller than a predetermined judgment threshold value.

13. A radar system according to claim 11, wherein the contamination judging means judges the contamination adhering to the radome when a state in which the deviation is equal to or smaller than a predetermined judgment threshold value continues for a predetermined period of time.

14. A radar system according to claim 11, wherein the radome is provided for an exterior of a vehicle.

15. A radar system according to claim 11, wherein the radome is provided for a casing which covers the antenna.

16. A contamination judging method, in which an antenna for transmitting an electromagnetic wave in a plurality of different directions as a transmission wave and for receiving a reflected wave from an object and a radome are used, the radome having a metallic reflecting section provided in a predetermined direction with respect to the antenna, comprising signal processing steps of calculating a distance to the object based on the transmission wave and the reflected wave, wherein the signal processing steps comprise:
- a first receiving step of transmitting the transmission wave in the predetermined direction of the radome to receive the reflected wave from the reflecting section;
- a second receiving step of transmitting the transmission wave in directions other than the predetermined direction of the radome to receive the reflected wave from the directions other than the predetermined direction;
- a deviation calculating step of calculating a deviation between a reception level of the reflected wave from the reflecting section and a reception level of the reflected wave from the directions other than the predetermined direction; and
- a contamination judging step of judging contamination adhering to the radome based on the deviation.

17. A contamination judging method according to claim 16, wherein judgment is made on the contamination adhering to the radome when the deviation is equal to or smaller than a predetermined judgment threshold value in the contamination judging step.

18. A contamination judging method according to claim 16, wherein judgment is made on the contamination adhering to the radome when a state in which the deviation is equal to or smaller than a predetermined judgment threshold value continues for a predetermined period of time in the contamination judging step.

19. A contamination judging method according to claim 16, wherein the radome is provided for an exterior of a vehicle.

20. A contamination judging method according to claim 16, wherein the radome is provided for a casing which covers the antenna.

21. A contamination judging method, in which an antenna for transmitting an electromagnetic wave in a plurality of different directions as a transmission wave and for receiving a reflected wave from an object and a radome are used, the radome having a liquid crystal layer, a holding layer for holding the liquid crystal layer, and a control electrode layer, energized at a predetermined timing, for applying an electric field to the liquid crystal layer, comprising signal processing steps of calculating a distance to the object based on the transmission wave and the reflected wave, wherein the signal processing steps comprise:
- a first receiving step of transmitting the transmission wave to the radome to receive the reflected wave when the control electrode layers are energized;
- a second receiving step of transmitting the transmission wave to the radome to receive the reflected wave when the control electrode layer is not energized;
- a deviation calculating step of calculating a deviation between a reception level of the reflected wave when the control electrode layer is energized and a reception level of the reflected wave when the control electrode layer is not energized; and
- a contamination judging step of judging contamination adhering to the radome based on the deviation.

22. A contamination judging method according to claim 21, wherein judgment is made on the contamination adhering to the radome when the deviation is equal to or smaller than a predetermined judgment threshold value in the contamination judging step.

23. A contamination judging method according to claim 21, wherein judgment is made on the contamination adhering to the radome when a state in which the deviation is equal to or smaller than a predetermined judgment threshold value continues for a predetermined period of time in the contamination judging step.

24. A contamination judging method according to claim 21, wherein the radome is provided for an exterior of a vehicle.

25. A contamination judging method according to claim 21, wherein the radome is provided for a casing which covers the antenna.

26. A contamination judging method, in which an antenna for transmitting an electromagnetic wave in a plurality of different directions as a transmission wave and for receiving a reflected wave from an object and a radome are used, the radome having a liquid crystal section containing a liquid crystal layer provided in a predetermined direction with respect to the antenna, a holding layer for holding the liquid crystal layer, and a control electrode layer, energized at a predetermined timing, for applying an electric field to the liquid crystal layer, comprising signal processing steps of calculating a distance to the object based on the transmission wave and reflected wave, wherein the signal processing steps comprise:
- a first receiving step of transmitting the transmission wave in the predetermined direction of the radome to receive the reflected wave from the liquid crystal section when the control electrode layers are energized;
- a second receiving step of transmitting the transmission wave to the radome to receive one of the reflected wave from the directions other than the predetermined direction and the reflected wave when the control electrode layer is not energized;
- a deviation calculating step of calculating a deviation between a reception level of the reflected wave from the liquid crystal section when the control electrode layer is energized and a reception level of one of the reflected wave from the directions other than the predetermined direction and the reflected wave when the control electrode layer is not energized; and
- a contamination judging step of judging contamination adhering to the radome based on the deviation.

27. A contamination judging method according to claim 26, wherein judgment is made on the contamination adhering to the radome when the deviation is equal to or smaller than a predetermined judgment threshold value in the contamination judging step.

28. A contamination judging method according to claim 26, wherein judgment is made on the contamination adhering to the radome when a state in which the deviation is equal to or smaller than a predetermined judgment threshold value continues for a predetermined period of time in the contamination judging step.

29. A contamination judging method according to claim 26, wherein the radome is provided for an exterior of a vehicle.

30. A contamination judging method according to claim 26, wherein the radome is provided for a casing which covers the antenna.

* * * * *